Aug. 13, 1935.  R. L. HASCHE  2,011,550
MANUFACTURE OF SOLID CARBON DIOXIDE
Filed Dec. 26, 1930
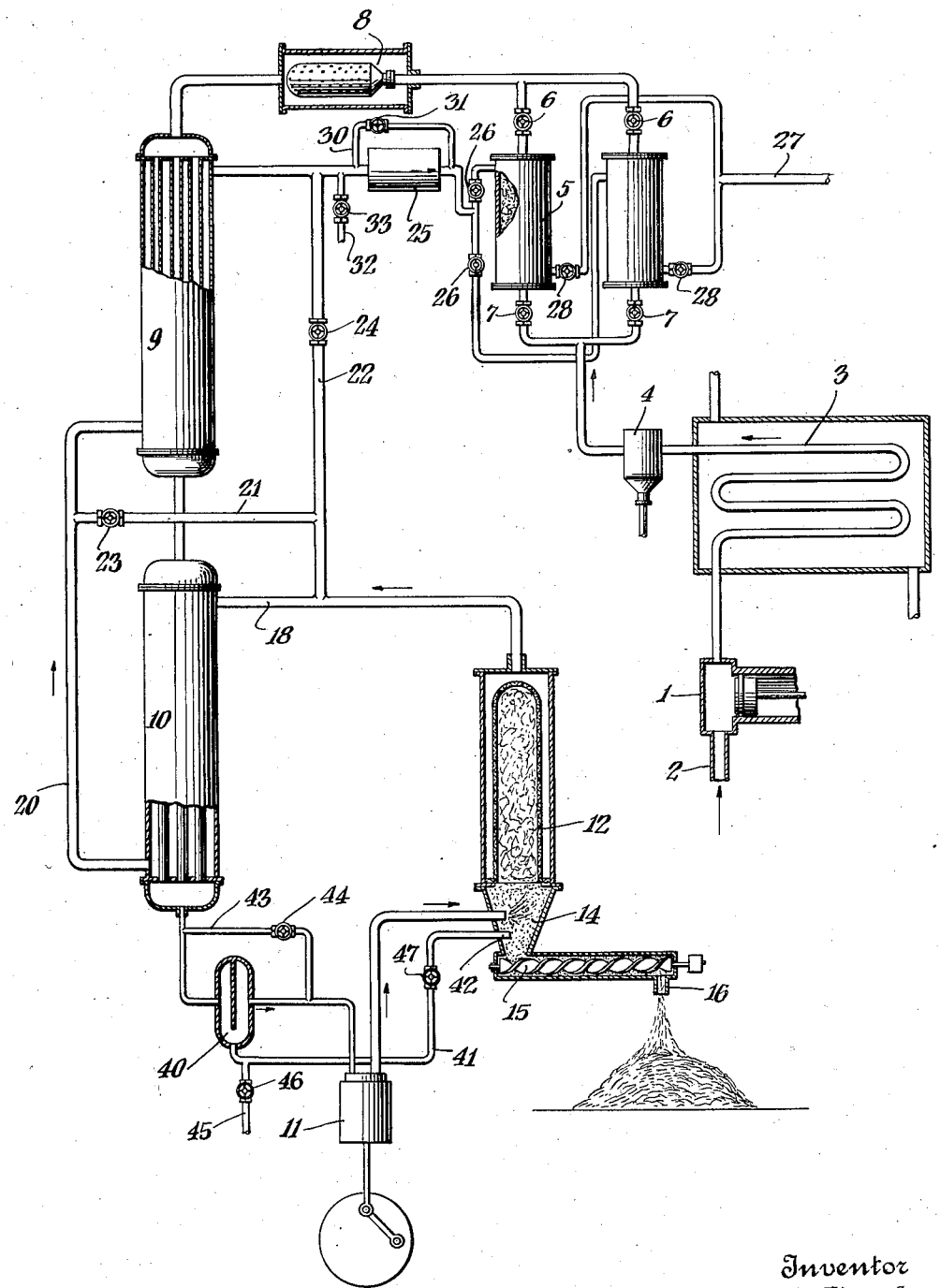
Inventor
Rudolph L. Hasche
By his Attorneys
Austin & Dix Patented Aug. 13, 1935

2,011,550

UNITED STATES PATENT OFFICE 2,011,550

MANUFACTURE OF SOLID CARBON DIOXIDE

Rudolph Leonard Hasche, Red Bank, N. J., assignor to Carbonic Development Corporation, a corporation of Delaware Application December 26, 1930, Serial No. 504,679

18 Claims. (Cl. 62—121)

This invention relates to refrigerating systems, and more particularly to a system for obtaining solid carbon dioxide from a gaseous mixture containing various percentages of carbon dioxide.

Methods heretofore commonly proposed and used for the commercial production of solid carbon dioxide involve the intermediate liquefaction and separation of liquid carbon dioxide, which is subsequently expanded, either through a nozzle or by free evaporation from the surface of the liquid, to produce the solid carbon dioxide. Such methods are, however, of relatively low efficiency.

The free expansion of liquid carbon dioxide with the production of internal work, comparable to the Joule-Thomson effect in gases, is accompanied by a considerable loss of energy since the process is irreversible and no power is recoverable. The operation is also of low thermal efficiency and results in a low recovery of solid, thereby making necessary the recirculating of large quantities of gas for recompression and reliquefaction.

The present invention provides a system for the recovery of solid $CO_2$ which operates at a high thermal efficiency and in which an increased yield is obtained. This is accomplished by separating $CO_2$ from the gaseous mixture simultaneously with the production of solid $CO_2$.

In practicing my invention a compressed gaseous mixture containing carbon dioxide is cooled to a temperature just above the solidification temperature of the carbon dioxide at the pressure employed. The gas is then applied to an expanding engine and expanded adiabatically with the production of external work, the gas thereby dropping in temperature substantially below the solidification temperature of carbon dioxide at the various pressures involved, whereby a large portion of that constituent freezes out in the form of a finely divided suspension or snow and is swept out of the engine with the exhaust gases. The solid carbon dioxide, in a finely divided state of subdivision, is then recovered from the gas stream and may be compressed into blocks of so-called "dry ice" or used in any other desired manner.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out may be better understood by referring to the following description taken in connection with the accompanying drawing forming a part thereof, in which the figure illustrates diagrammatically a system arranged in accordance with the present invention.

In the following description and in the claims parts will be identified by specific names for convenience, but they are intended to be as generic in their application to similar parts as the art will permit.

Referring to the drawing more in detail a system is shown in which the gaseous mixture, which has been previously freed of objectionable impurities by well known scrubbing or purification methods, enters the compressor 1 through pipe 2 and is therein compressed to a pressure of, for example, 15 to 25 atmospheres, depending upon the percentage of carbon dioxide contained in the gas.

The mixture is then passed through cooling coils 3 which may be of any well known construction, such as water coolers, in which the heat of compression is removed. A certain amount of water is condensed in cooler 3. The condensed water is largely removed by passing the mixture through a separator or trap 4; substantially the remainder of the moisture being removed by passing the mixture through one of a pair of beds 5 of adsorbent material, such as silica gel. The beds 5 are arranged with suitable valves 6 and 7 by which the beds may be used alternately so that one of the beds may be cut out of service for reactivation without interrupting the process.

The dried compressed gases may then be passed through a filter 8 of any desired form, as for example, a bag filter, in which dust particles or impurities, such as particles of silica gel, are removed. The gas is then passed downwardly through the tubes of the heat exchangers 9 and 10 in series, in which the gases are refrigerated to a temperature just above the solidification temperature of carbon dioxide at the partial pressure obtaining. The temperature is regulated, however, such that no solid separates in the exchangers thereby preventing deposition of solid carbon dioxide on the tubes of the exchangers which would interfere with the continuous operation of the process.

The compressed gaseous mixture, leaving exchanger 10 at a comparatively low temperature may then be passed through a separator 40 which is capable of removing any liquid which may have separated in said exchanger. The gas is then applied to an expanding engine 11 in which it is expanded adiabatically, with the production of external work, to approximately atmospheric pressure. The temperature of the gas drops in the expanding engine to a temperature, for example, of −170° F. This is obviously well below −109.6° F., the solidification point of the carbon dioxide at atmospheric pressure.

During this cooling in the expanding engine a large portion of the carbon dioxide present in the initial gas mixture separates as a finely divided solid which is held in suspension in the gas and is carried out of the engine together with the exhaust gases by the turbulent flow of the expanded gas. This mixture may be applied to a separating device, such as a bag filter 12, wherein the fine $CO_2$ is separated from the gas.

A suitable type of separator which has been employed comprises a bag filter of chamois, finely woven cotton or woolen fabric or similar material which is preferably mounted in an inverted position as illustrated in the drawing. It has been found that the pulsations of pressure caused by the engine cause the bag to vibrate rapidly whereby the solid $CO_2$ is dislodged therefrom and falls into hopper 14.

The solid may be removed from this hopper by suitable means, such as a screw conveyor 15 and may be discharged as at 16, after which it may be pressed into cakes of the proper density and used for refrigerating purposes. The fine state of sub-division of the particles permits the product to be readily compressed into cakes of solid $CO_2$.

The inlet to hopper 14 may be located at a tangent to the circular wall whereby the high velocity exhaust gases are not caused to cross the path of the downwardly flowing solid $CO_2$. The exhaust gases are thereby introduced tangentially of the hopper end and cause a rotary flow of gases, thus producing a centrifugal action that assists in the separation of the solid $CO_2$. The screw conveyor is preferably so arranged that the exhaust gases are prevented from escaping and the pressure of said gases is maintained.

The liquid in separator 40 may be withdrawn as such through pipe 45, or may be passed through pipe 41 and expanded through nozzle 42 into hopper 14 whereby the temperature thereof may be reduced sufficiently to convert a portion thereof into solid $CO_2$. Valves 46 and 47 may be used to control the flow of said liquid through pipes 45 and 41 respectively. A by-pass 43 controlled by a valve 44 is provided around separator 40 to permit the liquid to be applied directly into engine 11 if desired, whereby it may be expanded therein and converted into solid $CO_2$ by the reduction in pressure obtaining in the cylinder during expansion. Obviously, if the percentage of $CO_2$ is such that no liquid forms in exchanger 10, separator 40 may be by-passed and the gases applied directly to engine 11.

The stripped gases from which the $CO_2$ has been removed and which are at a low temperature are used as sources of refrigeration in exchangers 9 and 10. For this purpose they are applied through pipe 18 which enters the shell of container 10 at the top thereof whereby the gases are caused to flow downwardly in said exchanger around the tube compartments in a direction concurrent to the direction of flow of compressed gases. The stripped gases may then be withdrawn from the bottom of exchanger 10 through pipe 20 and applied to the bottom of exchanger 9 and caused to flow upwardly therein around the tube compartments and to serve as a refrigerating medium for the incoming compressed gases.

It will be noted that concurrent flow of gases is obtained in exchanger 10 and counter-current flow of gases in exchanger 9. This prevents a severe local cooling at the exit end of exchanger 10 which might be sufficient to cause the solid carbon dioxide to separate therein. It may be desirable in certain instances, however, to connect both exchangers in such a manner that counter-current flow of gases is obtained throughout the entire heat interchange therein.

For regulating the amount of cooling in exchangers 9 and 10, by-pass connections 21 and 22 having valves 23 and 24 respectively may be employed for by-passing a part of the low pressure refrigerating gas around either or both of the exchangers.

The stripped gases, after passing through the two exchangers, may be discarded or a portion thereof may be used for reactivation of the dehydrating beds 5. The dry gases are particularly suitable for the reactivation of beds 5 and the separation of moisture therefrom. For this purpose, a portion of the gases may be passed through a heater 25 of any desired construction in which they are heated to a suitable temperature for reactivation purposes. The gases may then be applied to one of the beds 5 and may be discharged therefrom through pipe 27. Valves 26 and 28 permit the gases to be applied only to the bed which has been cut out of service by closure of previously selected valves 6 and 7.

After the bed has been heated for reactivation it may be desirable to cool the same before again placing it in service. This may be accomplished by by-passing heater 25, as by pipe 30 controlled by valve 31, whereby cold exhaust gases may be passed through said bed. The portion of the gases which is not required for reactivation purposes may be discharged and discarded through pipe 32 controlled by valve 33.

In carrying out the above process it may be noted that the triple point for carbon dioxide occurs at a temperature of −69.9° F. and at a pressure of 5.11 atmospheres. When the partial pressure of the carbon dioxide is below the triple point the gas will pass directly into the solid form without passing through an intermediate liquid phase. The point of solidification is reached when the temperature is lowered sufficiently so that the vapor pressure of the solid $CO_2$ equals the partial pressure of the carbon dioxide in the gas. The solid $CO_2$ will begin forming as soon as this temperature is reached and will continue with lowering of temperature until the $CO_2$ has been completely removed or available refrigeration exhausted.

If the partial pressure of the carbon dioxide is above the triple point, however, the gas will pass through the liquid stage as it is progressively cooled. In either case the complete change from the gaseous phase to the solid phase may be caused to take place during expansion in the expanding engine. Hence, the carbon dioxide is separated from the gas mixture and is converted into a solid in a single operation. It is to be understood however, that certain quantities of liquid may be applied to engine 11 from separator 40 and may be cooled by expansion in said engine to a temperature such that solid $CO_2$ is produced. This may be desirable with gases rich in $CO_2$ in which the partial pressure of the $CO_2$ is above the triple point or it may be desirable to remove part or all of the liquid from the system as such without converting it into a solid form.

The process is applicable to gas mixtures containing various percentages of carbon dioxide. For example, when the process is applied to by-product gases, such as flue gas containing from 6% to 20% carbon dioxide, the gas mixture is preferably compressed to such a pressure that the partial pressure of the carbon dioxide falls below the triple point. In this case the mixture is cooled to just above the solidification temperature in exchanger 10, although the temperature is so regulated that no solid separates out in said exchanger. No liquid will be formed inasmuch as the pressure is below that of the triple point of carbon dioxide. The cold gas may be accordingly by-passed around separator 40 and applied to expanding engine 11 wherein the carbon dioxide is converted into solid carbon dioxide snow.

The process may also be applied to a comparatively strong gas, that is, to a gas containing more than 20% of carbon dioxide in which case the partial pressure of the carbon dioxide may be above the triple point. The gas will then be cooled in exchanger 10 as above described, and a certain amount of liquid will separate therein. This may be passed into the expanding engine, together with the gas or it may be separated by separator 40 and separately expanded from nozzle 42 in hopper 14. If the process is applied to 100% carbon dioxide gas under high pressure, as for example, a gas from a natural carbon dioxide well, the gas may be applied directly to the expanding engine or it may be pre-cooled to a temperature just above the solidification temperature of the carbon dioxide. If the gas is run directly into the expanding engine the reduction of temperature therein will cause the formation of solid carbon dioxide snow in the manner above pointed out. If, however, the gas is first cooled, some liquid may be separated therefrom and separately expanded or may also be applied to the expanding engine as in the example above mentioned.

The above system is particularly efficient inasmuch as the solid $CO_2$ is produced in a single step and is swept out of the engine together with the exhaust gases which are then used as a refrigerant for cooling further quantities of compressed gases to the desired point before application to the expanding engine.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. The process of recovering solid carbon dioxide from a gas mixture containing carbon dioxide as a constituent under a partial pressure above atmospheric which comprises cooling the gas to a temperature just above the solidification temperature of carbon dioxide at said partial pressure, expanding said gases adiabatically with the production of external work whereby the mixture is cooled substantially below said solidification point and carbon dioxide is caused to separate within the expanding mechanism in the form of finely divided solid particles and causing said particles to be carried along with the gas stream away from the expanding mechanism.

2. The process of recovering solid carbon dioxide from a gas mixture containing carbon dioxide as a constituent under a partial pressure above atmospheric which comprises cooling the gas to a temperature just above the solidification temperature of carbon dioxide at said partial pressure, expanding said gases adiabatically with the production of external work whereby the mixture is cooled substantially below said solidification point and carbon dioxide is caused to separate within the expanding mechanism in the form of finely divided solid particles, causing said particles to be carried along with the gas stream away from the expanding mechanism and passing the gases through a filter capable of removing said solid particles from said gas.

3. The process of cooling a compressed gas in a plurality of heat exchangers which comprises passing said gas in series through said exchangers, applying a cooling medium to said exchangers and causing said cooling medium and said gas to circulate counter-currently in the first exchanger and concurrently in the second exchanger, the arrangement being such that sudden chilling of the gas prior to discharge from the second exchanger is avoided.

4. A system for obtaining solid carbon dioxide which comprises means for compressing and drying a gas mixture, a pair of heat exchangers, means for passing said compressed mixture in series through said exchangers, a source of cooling medium for said exchangers, and means for circulating said cooling medium concurrently in the second exchanger and counter-currently in the first exchanger whereby sudden cooling of the compressed gases prior to discharge from the second exchanger is prevented.

5. In a system for recovering solid carbon dioxide from a gas mixture, an expanding engine, means for compressing and drying said gas mixture and cooling the same to a temperature such that when expanded in said engine a temperature will be reached substantially below the solidification temperature of carbon dioxide at the pressure involved whereby a finely divided solid carbon dioxide is produced within said expanding engine, a filter for removing said finely divided solid comprising a bag, and means whereby the pressure variation produced by the engine causes said bag to vibrate and dislodge the solid carbon dioxide therefrom.

6. In combination with an expanding engine in which a finely divided solid is produced, a yieldable filter connected in proximity to said engine for removing said solid from the exhaust gases and means whereby the pressure variation produced by said engine causes said filter to vibrate and dislodge the solid particles therefrom.

7. The method of solidifying a gas which comprises compressing a mixture containing said gas, passing the compressed mixture continuously through a heat exchanger, cooling the mixture in said heat exchanger to a temperature above the solidification temperature of the gas to be solidified at the partial pressure used, expanding the cooled mixture adiabatically with the production of external work to materially lower the temperature of the compressed mixture causing the desired gas to solidify, separating the solidified gas from the unsolidified gas, and feeding the stripped unsolidified gas back to said heat exchanger to cool the incoming gas as aforesaid and to maintain continuously the temperature of the mixture leaving the heat exchanger above the solidification temperature thereof.

8. The method of making solid carbon dioxide which comprises compressing carbon dioxide gas, passing the compressed gas continuously through a heat exchanger, cooling the gas in said heat exchanger to a temperature above the solidification temperature of the carbon dioxide at the partial pressure used, expanding the cooled gas adiabatically with the production of external work to materially lower the temperature of the compressed gas causing carbon dioxide to solidify, separating the solid carbon dioxide from the unsolidified gas, and feeding the stripped unsolidified gas back to said heat exchanger to cool the incoming gas as aforesaid and to maintain continuously the temperature of the gas leaving the heat exchanger above the solidification temperature of the carbon dioxide.

9. The method of making solid carbon dioxide which comprises compressing a mixture of carbon dioxide and other gases to give a partial pressure of the carbon dioxide above the triple point, passing the mixture continuously through a heat exchanger, cooling the mixture in said heat exchanger to the liquefaction temperature of the carbon dioxide at the said partial pressure, separating out the liquid carbon dioxide, further cooling the gaseous mixture in the heat exchanger to a temperature just above the solidification temperature of the carbon dioxide at said partial pressure, expanding the mixture of cooled gases adiabatically with the production of external work to materially lower the temperature of the compressed mixture of gases causing the carbon dioxide to solidify, separating the carbon dioxide from the unsolidified gas, and feeding the stripped unsolidified gases back to said heat exchanger to cool the incoming mixture and to maintain continuously the temperature of the gases leaving the heat exchanger just above the solidification temperature of the carbon dioxide.

10. The method of making solid carbon dioxide which comprises compressing a mixture of carbon dioxide and other gases to give a partial pressure of the carbon dioxide above the triple point, cooling the mixture in a heat exchanger to a temperature above the solidification temperature of the carbon dioxide at the partial pressure used, expanding the cooled mixture of gases adiabatically with the production of external work to materially lower the temperature of the compressed mixture of gases causing the carbon dioxide to solidify, and separating the solid carbon dioxide from the unsolidified gas.

11. The method of solidifying a gas which comprises compressing the gas, passing the gas through adsorbent material to remove the moisture therefrom, passing the gas through a heat exchanger to cool the gas, expanding the cooled gas adiabatically with the production of external work to cause some of the gas to solidify, feeding the unsolidified stripped gas back to said heat exchanger to cool the incoming gas, and then using the stripped gas to reactivate said adsorbent material.

12. The method of solidifying a gas which comprises compressing the gas, passing the gas through adsorbent material to remove moisture therefrom, expanding the gas adiabatically to cause some of the gas to solidify, and using the stripped unsolidified gas to reactivate said adsorbent material.

13. The method of making solid carbon dioxide which comprises compressing carbon dioxide gas, passing the gas through a drying device to remove water, passing the dry compressed gas continuously through a surface type heat exchanger, cooling the gas in the heat exchanger to a temperature above the solidification temperature of the carbon dioxide and expanding the cooled gas adiabatically with the production of external work to materially lower the temperature thereof and cause the carbon dioxide to solidify.

14. The method of making solid carbon dioxide which comprises compressing gaseous carbon dioxide, expanding it adiabatically in an expanding engine to do external work and thereby causing the solid carbon dioxide to form within the engine, carrying out the solid carbon dioxide along with the exhaust from the engine and then separating the solid from the gas.

15. The method of solidifying a gas which comprises compressing the gas, expanding it adiabatically in an expanding engine to do external work and thereby causing the solid to form within the engine, carrying out the solidified gas along with the exhaust from the engine, and then separating the solid from the gas.

16. The process of recovering solid carbon dioxide from a gas mixture containing carbon dioxide as a constituent at a partial pressure above atmospheric which comprises cooling the gas to a temperature just above the solidification temperature of carbon dioxide at said partial pressure, expanding said gases adiabatically with the production of external work whereby the mixture is cooled substantially below said solidification point and carbon dioxide is caused to separate in the form of finely divided solid particles, causing said particles to be carried along with the gas stream away from the expanding mechanism and passing the gases through a filter capable of removing said solid particles and then utilizing the stripped gases as a refrigerating medium for cooling further quantities of compressed gases prior to expansion in the step above mentioned.

17. The process for producing solid carbon dioxide from a gas having a suitable temperature and pressure which comprises adiabatically expanding said gas in an expanding engine to do external work, said expansion being carried to such lower pressure and temperature that the cooling produced thereby causes the carbon dioxide to solidify in a finely divided state within the engine, and carrying out the solid carbon dioxide along with the exhaust gases from the engine.

18. The continuous process for producing solid carbon dioxide from a mixture of gases which comprises compressing said mixture and passing said compressed mixture continuously through a surface type heat exchanger to refrigerate the mixture to a point above the solidification point of carbon dioxide adiabatically expanding such compressed refrigerated mixture in an expanding engine with the production of external work to cause the solid carbon dioxide to solidify in a finely divided state within the engine, carrying out the solid carbon dioxide along with the exhaust gases from the engine, separating the solid carbon dioxide from said exhaust gases, and continuously passing the stripped gases through said heat exchanger to refrigerate the incoming mixture as aforesaid.

RUDOLPH LEONARD HASCHE.